United States Patent
Mori

(10) Patent No.: US 8,135,905 B2
(45) Date of Patent: Mar. 13, 2012

(54) STORAGE SYSTEM AND POWER CONSUMPTION REDUCTION METHOD FOR SWITCHING ON/OFF THE POWER OF DISK DEVICES ASSOCIATED WITH LOGICAL UNITS IN GROUPS CONFIGURED FROM THE LOGICAL UNITS

(75) Inventor: Hajime Mori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1096 days.

(21) Appl. No.: 11/972,001

(22) Filed: Jan. 10, 2008

(65) Prior Publication Data

US 2009/0063883 A1    Mar. 5, 2009

(30) Foreign Application Priority Data

Aug. 30, 2007  (JP) ................................ 2007-224743

(51) Int. Cl.
*G06F 12/00* (2006.01)
(52) U.S. Cl. ............ 711/114; 711/4; 711/112; 711/159; 711/216; 713/320; 713/324
(58) Field of Classification Search .............. 711/4, 112, 711/114, 159, 216; 713/320, 324
See application file for complete search history.

(56) References Cited

U.S. PATENT DOCUMENTS

| 5,423,046 | A | 6/1995 | Nunnelley et al. | |
|---|---|---|---|---|
| 6,889,297 | B2* | 5/2005 | Krapp et al. | 711/159 |
| 6,928,526 | B1 | 8/2005 | Zhu et al. | |
| 7,472,242 | B1* | 12/2008 | Deshmukh et al. | 711/162 |
| 7,747,584 | B1* | 6/2010 | Jernigan, IV | 707/692 |
| 2009/0019246 | A1* | 1/2009 | Murase | 711/162 |

* cited by examiner

*Primary Examiner* — Arpan P. Savla
(74) *Attorney, Agent, or Firm* — Brundidge & Stanger, P.C.

(57) ABSTRACT

This invention achieves data capacity efficiency via data de-duplication and maximizes a power-saving effect by disk operation control. In a storage system, when data is received from a computer, a value representing the bit string for the data is calculated and whether or not a value identical to the calculated value is stored in a data management table is judged. If it is judged that an identical value is not stored, the received data is registered in the data management table and stored, based on a group management table, in disk device(s) associated with a logical unit number of a logical unit constituting an active group. Meanwhile, if it is judged that an identical value is stored, the received data is stored in disk device(s) based on the group information managed in the group management table and the management information managed in the data management table.

14 Claims, 10 Drawing Sheets

| POWER-SAVING GROUP IDENTIFICATION NUMBER | STATUS | RAID GROUP NUMBER | LU NUMBER | VOLUME OCCUPANCY RATE |
|---|---|---|---|---|
| P-01 | ACTIVE | RG01 | LU01, LU02 | 50% |
| P-02 | INACTIVE | RG02 | LU03 | 10% |
| P-03 | INACTIVE | RG03 | LU04, LU05 | 10% |
| P-04 | INACTIVE | RG04 | LU06 | 0% |

| HASH VALUE | REAL DATA-STORING ADDRESS (LU NUMBER: LBA) | HOST-DESIGNATED ADDRESS (LU NUMBER: LBA) |
|---|---|---|
| a | LU01:100000 | 001:101000 |
|  |  | 001:103000 |
|  | LU01:100001 | 001:104000 |
| b | LU02:100100 | 001:114000 |
| c | LU02:102000 | 001:134000 |

| HOST (2261) | HOST-SIDE VOLUME NUMBER (2262) | REAL VOLUME LU NUMBER (2263) |
|---|---|---|
| A | 001 | LU01, LU02, LU03, LU04 LU05, LU06 |

| TEMPORARY DATA STORAGE ADDRESS (LU NUMBER: LBA) (2251) | HOST-DESIGNATED ADDRESS (2252) | HASH VALUE (2253) |
|---|---|---|
| LU03:100000 | 001:109000 | a |
| LU03:100100 | 001:109500 | b |
| LU04:102000 | 001:107000 | a |

| HASH VALUE | ACTIVATION TARGET POWER-SAVING GROUP | NUMBER-OF-PIECES -OF-DATA HAVING IDENTICAL HASH VALUE |
|---|---|---|
| a | RG01 | 2 |
|   | RG02 | 1 |
|   | RG03 | 1 |
| b | RG01 | 1 |
|   | RG02 | 1 |

| 2281 | 2282 | 2283 | 2284 |
|---|---|---|---|
| HASH VALUE | REAL DATA-STORING ADDRESS (LU NUMBER: LBA) | HOST-DESIGNATED ADDRESS (LU NUMBER: LBA) | RELEVANT ADDRESS (LU NUMBER: LBA) |
| a | LU01:100000 | 001:101000 | LU02:100100<br>LU02:102000 |
|   |   | 001:103000 | -- |
|   | LU01:100001 | 001:104000 | LU03:100100 |
| b | LU02:100100 | 001:114000 | LU01:100000<br>LU02:102000 |
| c | LU02:102000 | 001:134000 | LU01:100000<br>LU02:100100 |

| 2291 | 2292 | 2293 | 2294 |
|---|---|---|---|
| TEMPORARY DATA STORAGE ADDRESS (LU NUMBER: LBA) | HOST-DESIGNATED ADDRESS | HASH VALUE | RELEVANT ADDRESS (LU NUMBER: LBA) |
| LU03:100000 | 001:109000 | a | -- |
| LU03:100100 | 001:109500 | b | LU01:100001 |
| LU04:102000 | 001:107000 | a | -- |

STORAGE SYSTEM AND POWER CONSUMPTION REDUCTION METHOD FOR SWITCHING ON/OFF THE POWER OF DISK DEVICES ASSOCIATED WITH LOGICAL UNITS IN GROUPS CONFIGURED FROM THE LOGICAL UNITS

CROSS-REFERENCES TO RELATED APPLICATIONS

This application relates to and claims priority from Japanese Patent Application No. 2007-224743, filed on Aug. 30, 2007, the entire disclosure of which is incorporated herein by reference.

BACKGROUND

1. Field of the Invention

The present invention relates to a storage system and a power consumption reduction method for the storage system, and is suitable for use in a storage system using disks and a power consumption reduction method for the storage system.

2. Description of Related Art

In relation to the backup and archival of business data, a data de-duplication technique (hereinafter sometimes called "data de-duplication") has been suggested, with which data will not be stored in disks redundantly to avoid unnecessary increase in the amount of data in disk arrays and improve the efficiency of the data capacity. With the data de-duplication technique, when the content of new data to be written in the disks, i.e., so-called write data, is identical to that of data already stored on the disks, the write data is not written to the disks. Judgment on whether the content of the write data is identical to that of the data already stored on the disks is usually conducted by a high-speed search using hashes (see, e.g., Patent Document 1).

A disk array is an apparatus having a number of disks. Operating these disks at the same time increases the power consumption in the entire disk array. To solve this problem, a technique for reducing power consumption by limiting the number of concurrently-active disks in the disk array so that the power consumption in the entire disk array can be reduced, thus producing a power-saving effect, has been suggested (see, e.g., Patent Document 2).

| [Patent Document 1] | U.S. Pat. No. 6,928,526 |
| [Patent Document 2] | U.S. Pat. No. 5,423,046 |

With conventional storage systems using disks, no consideration has been given to the simultaneous performance of both the de-duplication of data in disks and power consumption control. Accordingly, even if disk arrays performing data de-duplication try to reduce power consumption by limiting the number of active disks, efficient disk operation control cannot be achieved because they have been designed with no consideration given to the disk access required in the de-duplication. Accordingly, unnecessary disks operate and an optimal power-saving effect cannot be produced.

This invention has been devised in light of the above points and aims to provide a storage system and a power consumption reduction method, capable of maximizing the data capacity efficiency and the power-saving effect when the data de-duplication and the disk operation control are performed simultaneously.

Summary

The invention provides a storage system including: a computer; and a storage apparatus having a plurality of disk devices storing pieces of data sent from the computer and a plurality of logical units configured from the disk devices, comprising: a group management table storing group information including at least information for one or more groups configured from the logical units and information on whether or not these groups are active; a power control unit for switching ON/OFF of the power of the disk devices associated with the logical units in the groups; a data management table storing management information including: logical unit numbers for the logical units associated with storage locations of the pieces of data stored in the disk devices; values representing bit strings for the pieces of data; and computer-designated numbers associated with the logical units; a calculation unit for calculating, when receiving a piece of data from the computer, a value representing the bit string for the piece of data; a judgment unit for judging whether or not a value identical to the value calculated by the calculation unit is stored in the data management table; a first storing unit for storing, when the judgment unit judges that no identical value is stored, the received piece of data in the data management table and storing it in one or more disk devices associated with a logical unit number of a logical unit constituting an active group, based on the group management table; and a second storing unit for storing, when the judgment unit judges that an identical value is stored, the received piece of data in one or more of the disk devices based on the group information in the group management table and the management information in the data management table.

According to the invention, it is possible to maximize the data capacity efficiency and power-saving effect when the data de-duplication and disk operation control are performed at the same time.

BRIEF DESCRIPTION OF THE DRAWINGS

FIG. 2 shows a power-saving group management table according to Embodiment 1.

FIG. 3 shows a duplicate data management table according to Embodiment 1.

FIG. 4 shows a data pool management table according to Embodiment 1.

FIG. 5 shows a duplication un-compared data management table according to Embodiment 1.

FIG. 12 shows a duplicate data management table according to Embodiment 3.

FIG. 13 shows a duplication un-compared data management table according to Embodiment 3.

DETAILED DESCRIPTION OF PREFERRED EMBODIMENTS

Embodiments of the invention will be explained below with reference to the drawings.

Embodiment 1 (1-1) Configuration

Figure 1:
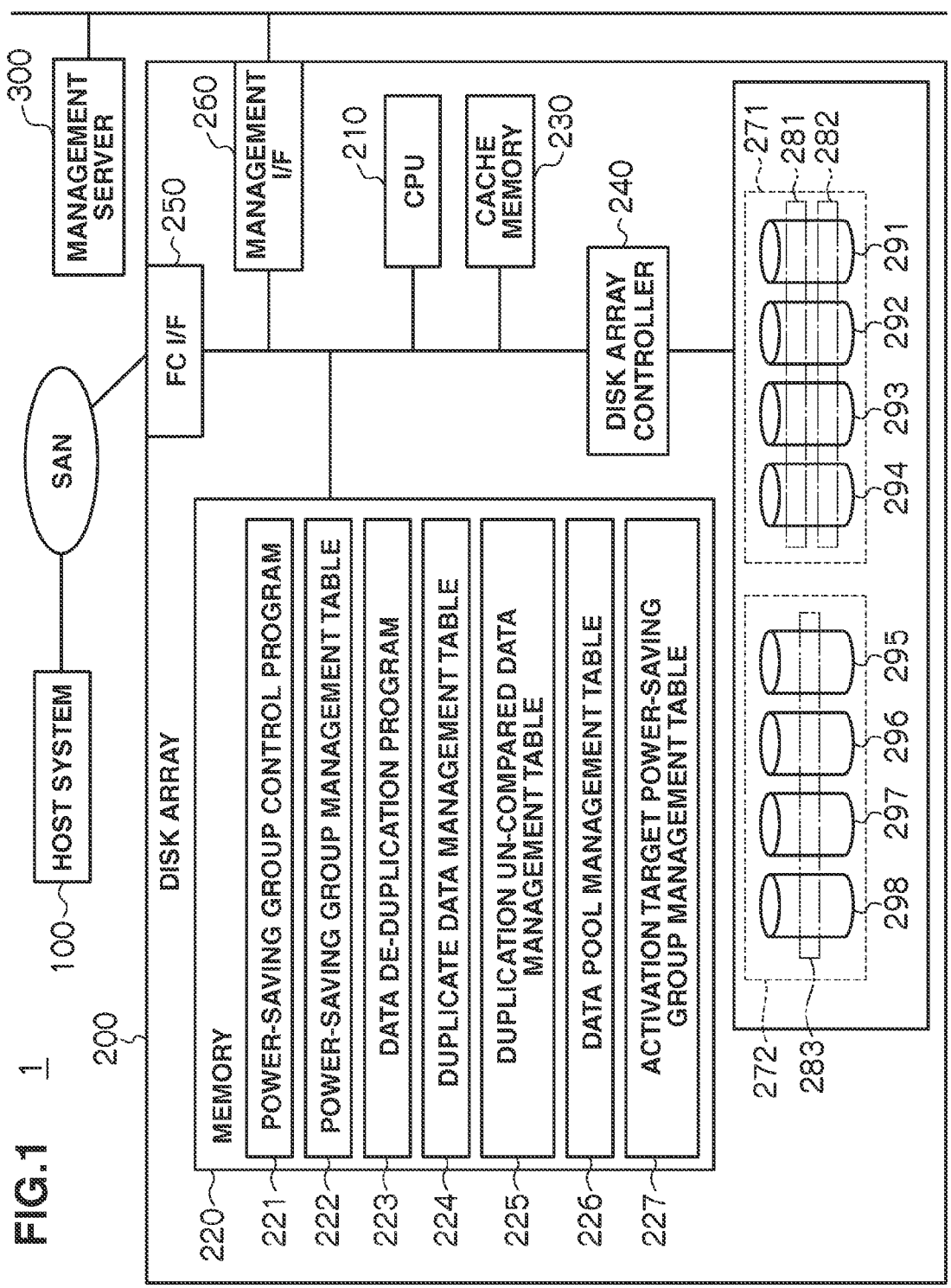
FIG. 1 shows the configuration of a storage system according to Embodiment 1 of the invention.

FIG. 1 shows an example of the configuration of a storage system 1. In FIG. 1, a host system 100—a computer with an application program for business or similar running—and a disk array 200 storing data transmitted from the host system 100 are connected to each other via a SAN (Storage Area Network). Note that although FIG. 1 shows only one host system 100 as a computer in FIG. 1, there may be more than one computer in practice.

The disk array 200 has a Fibre Channel interface ("FC I/F") 250 connected to the SAN, and a management interface ("management I/F") 260. Note that the management I/F 260 is used when sending/receiving the data in the disk array 200 to/from other apparatuses such as a management server 300. The FC I/F 250 is used when sending the data written in the disk array 200 to the host system 100 or receiving the data to be written in the disk array from the host system 100.

The disk array 200 also has a CPU 210 for controlling the disk array 200, memory 220 storing various management tables and programs, and cache memory 230 storing user data. It also includes a disk controller 240 for controlling the disks 291-298.

The disk controller 240 is connected to the disks 291-298. RAID groups 271 and 272 are set in the disk set (disks 291-298), each RAID group having a redundancy configuration called RAID (Redundant Arrays of Independent/Inexpensive Disks). SCSI logical units (LUs: Logical Units) 281-283 are set in the storage areas in the disks 291-298 and the host system 100 accesses these logical units 281-283. In FIG. 1, each LU 281-283 is a storage area existing across more than one disk in the disk set, however, it may also be a storage area existing in a single disk. Also, each LU may be a storage area set across more than one RAID group.

The memory 220 stores a power-saving group control program 221, power-saving group management table 222, data de-duplication program 223, duplicate data management table 224, duplication un-compared data management table 225, data pool management table 226, and activation target power-saving group management table 227. These tables will be explained later in detail.

(1-2) Power Consumption Reduction in Disk Array

In Embodiment 1, the power-saving group control program 221 uses the power-saving group management table 222 to control activation/deactivation of the disks 291-298 in the disk array 200 so that the power consumption can be reduced.

In the power-saving group control program 221, power-saving groups are previously set on a RAID group-by-group basis, an LU-by-LU basis, or disk-by-disk basis according to the specifications of the disk array 200 or by a network administrator. Also, an upper limit is set in advance for the number of concurrently-active power-saving groups.

The power-saving group management table 222 in FIG. 2 is for managing power-saving groups. It includes a power-saving group identification number field 2221, status field 2222, RAID group number field 2223, LU number field 2224, and volume occupancy rate field 2225.

The power-saving group identification number field 2221 stores the power-saving group identifiers. The status field 2222 stores the operational statuses for the power-saving groups and associates them with the power-saving group identification numbers. The RAID group number field 2223 stores the RAID group numbers in the power-saving groups. The LU number field 2224 stores the identifiers for the LUs. The volume occupancy rate field 2225 stores the occupancy rates of the volumes in the power-saving groups.

Information is stored in the power-saving group management table 222 as shown the example of FIG. 2 where, for the power-saving group identification number "P-01" in the power-saving group identification number field 2221, "active" is stored in the status field 2222, "RG01" is stored in the RAID group number field 2223, "LU01, LU02" is stored in the LU number field 2224, and "50%" is stored in the volume occupancy rate field 2225.

The power-saving group control program 221 knows the number of currently active power-saving groups based on the power-saving group identification numbers stored in the power-saving group identification number fields 2221 and the statuses stored in the status fields 2222 in the power-saving group management table 222, and controls the number of the active power-saving groups in the disk array 200 so that it does not exceed the above-described upper limit.

In Embodiment 1, the power-saving group control program 221 sets power-saving groups on a RAID group-by-group basis. When a specified LU is accessed, the power-saving group control program 221 refers to the power-saving group management table 222 to check the RAID group numbers stored in the RAID group number field 2223, the statuses stored in the status field 2222, and the numbers of the LUs in the RAID groups stored in the LU number field 2224. It judges, based on the entry in the line in the status field 2222 corresponding to the RAID group the above specified LU belongs to, whether or not it is necessary to activate that RAID group. If it is necessary to activate the RAID group, the power-saving group control program 221 further judges whether or not the activation of the RAID group is restricted by the upper limit. If the activation of the specified RAID group is not restricted, the power-saving group control program 221 allows execution of the data access to the specified LU, i.e., activates the RAID group the specified LU belongs to and enables access to the data in the relevant disks. Meanwhile, if the activation of the RAID group is restricted by the upper limit, the power-saving group control program 221 queues the data access. This is a well-known technique so only the details related to this example will be explained below.

Note that Embodiment 1 is explained giving an example where power-saving groups are set on a RAID group-by-group basis. However, they may alternatively be set on a LU-by-LU basis; disk-by-disk basis; shelf-by-shelf basis or chassis-by-chassis basis, the shelf or chassis being provided with power from the same power source; or a disk array-by-disk array basis.

Figures 10, 11:
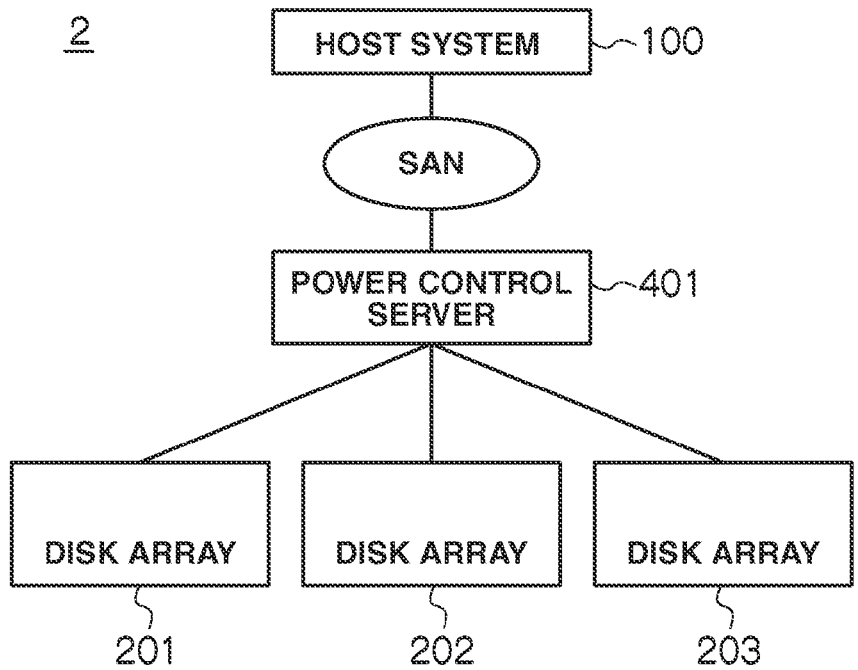
FIG. 10 shows a modified example of the configuration of the storage system according to Embodiment 1.
FIG. 11 shows an activation target power-saving group management table according to Embodiment 2.

Depending on what basis the power-saving groups are set on, the number of elements belonging to each power-saving group, which is listed in the power-saving group management table 222 in FIG. 2, increases/decreases. FIG. 10 shows the configuration of a storage system 2 where, for example, the power-saving groups are set on a disk array-by-disk array basis and so the power saving control is performed across more than one disk array. The disk arrays 201-203 are configured the same way as the disk array 200 in FIG. 1. Explanations for the configurations of the disk arrays 201-203 will be omitted.

In the example of FIG. 10, the power-saving group control program 221 runs on a power control server 401, which is a computer connected to the disk arrays 200-203 that are the targets for the power saving control. The power control server 401 has the power-saving group management table 222 stored in its memory so that the power-saving group control program 221 can use it.

Note that although the power control server 401 is shown as an independent, dedicated server, it may alternatively be provided in another apparatus, for example, a storage virtualization apparatus or FC (Fiber Channel) switch. The power-saving group control program 221 running on the power control server 401 collects the "status" information—active, inactive—for the disk arrays 201-203 stored in the status field 2222; and controls the activation/deactivation of the disk arrays 201-203. In other words, the power-saving group control program 221 monitors the access from the host system 100 to the disk arrays 201-203 and, if the host system 100 tries to access an inactive disk array, it judges whether or not the activation of the inactive disk array will exceed the upper limit for the number of concurrently-active disk arrays, and controls the activation/deactivation of the disk arrays based on that judgment.

Note that, in addition to the control by the power-saving group control program 221 running on the power control server 401, each disk array 201-203 may also have its own power-saving group control program 221 so that it sets power-saving groups on a shelf-by-shelf basis, chassis-by-chassis basis, a RAID group-by-group basis, LU-by-LU basis, or disk-by-disk basis in its own disk array and controls the operational statuses of the power-saving groups. Needless to say, these controls may be integrally performed by the power control server 401.

It is also possible to adopt another configuration where, unlike the storage system 2 in FIG. 10, a storage system has no power control server 401, each disk array 201-203 has its own power-saving group control program 221, and the power-saving group control program 221 in one of the disk arrays serves as the power control server 401 and controls the activation/deactivation of the rest of the disk arrays. In that configuration, when the disk array running the power-saving group control program is deactivated, the information concerning the power saving control and operational statuses will be taken over to another active disk array.

It is also possible to adopt still another configuration where each disk array 201-203 executes power saving control separately by synchronizing its own power-saving group information with that in the other disk arrays.

Note that although the power saving control in Embodiment 1 is performed by controlling the activation/deactivation of the disks on a RAID group-by-group basis, it may also be performed by putting each power-saving group in a unique power saving status, for example, putting the disks in a power-saving group in a sleep mode.

(1-3) Data De-Duplication

In Embodiment 1, the data de-duplication program 223 refers to a duplicate data management table 224 to control the writing of, from among the pieces of data to be written in the disks, those identical in content with the pieces of data already stored in the disks, thereby producing the effect of reducing the amount of data stored in the disks 291-298.

FIG. 3 shows the duplicate data management table 224. The duplicate data management table 224 is for managing the duplicate pieces of data stored in the disks 291-298. It has a hash value field 2241, real data-storing address field 2242, and host-designated address field 2243.

The hash value field 2241 stores the hash values for the pieces of data. The real data-storing address field 2242 stores LU numbers: LBAs. The host-designated address field 2243 also stores LU numbers: LBAs.

Information is stored in the duplicate data management table 224 as shown in the example in FIG. 3 where, for the hash value "a" stored in the hash value field 2241, "LU01: 100000" is stored in the real data-storing address field 2242, and "001:101000" is stored in the host-designated address field 2243.

Explanations will be given below for the processing performed by the data de-duplication program 223 using the duplicate data management table 224. When the disk array 200 receives, from the host system 100, write data and a logical address ("host-designated address") specifying the write destination for the write data, the data de-duplication program 223 calculates a hash value that represents the write data; compares it with the hash values stored in the hash value field 2241 in the duplicate data management table 224 to judge whether or not the write data is identical in content to a piece of data already written in the disks 291-298.

If no value in the duplicate data management table 224 is found to be identical to the hash value of the write data, the data de-duplication program 223 writes the write data as new data in the disks; adds a line to the duplicate data management table 224; and stores the hash value of the write data in the hash value field 2241, the logical address of the write destination in the disks in the real data-storing address field 2242, and the host-designated address in the host-designated address field 2243.

Meanwhile, if a value identical to the hash value of the write data is found in the duplicate data management table 224, the data de-duplication program 223 judges that identical data may have already been written in the disks. Then it refers to the duplicate data management table 224; reads the data stored in the disks identified by the logical address stored in the real data-storing address field 2242 corresponding to the hash value identical to that of the write data; and compares the content of that data with that of the write data.

If it is found in the comparison that the two pieces of data match, the data de-duplication program 223 does not write the write data in the disks but adds the current host-designated address to the host-designated address field 2243 in the line corresponding to the hash value identical to that of the write data, in the duplicate data management table 224.

Meanwhile, if it is found in the comparison that the two pieces of data do not match, it means a synonym—in which identical values represent different pieces of data—has occurred. In this case, the data de-duplication program 223 writes the write data in the disks; adds the logical address of the write destination of the write data to the real data-storing address field 2242 in the line corresponding to the hash value identical to that of the write data in the duplicate data management table 224; and also adds the current host-designated address to the corresponding host-designated address field 2243.

To put it more simply, when the synonym occurs, identical hash values represent different pieces of data in the disks. Accordingly, the duplicate data management table 224 stores, for one hash value, more than one combination of a real data-storing address and a host-designated address.

Incidentally, when the host system 100 reads data, the data de-duplication program 223 refers to the host-designated address field 2243 in the duplicate data management table 224; reads the data from the disks identified by the logical address stored in the corresponding real data-storing address field 2242; and sends it to the host system 100. Note that this is a well-known technique so only the details related to Embodiment 1 will be explained below.

The disk array 200 has a storage volume virtualization mechanism for having, using a data pool management table 226, the host system 100 recognize the LUs indicated in a "real volume LU number" field 2263 as one or more virtual LUs indicated in the "host-side volume number" field 2262. This is a common, well-known storage virtualization technique and the virtualization mechanism itself is not a significant feature in Embodiment 1, so the detail explanations for the technique will be omitted.

As shown in FIG. 4, the data pool management table 226 includes a host field 2261, host-side volume number field 2262, and real volume LU number field 2263. The host field 2261 stores the host information. The host-side volume number field 2262 stores the volume numbers on the host side. The real volume LU number field 2263 stores the real volume LU numbers corresponding to the host-side volume numbers. Information is stored in the data pool management table 226, for example, for the host "A" stored in the host field 2261, "001" is stored in the host-side volume number field 2262, and "LU01, LU02, LU03, LU04, LU05, LU06" is stored in the real volume LU number field 2263.

In Embodiment 1, the data de-duplication is applied to the real volume LUs that are associated with the host-recognizable virtual LUs and registered in the real volume LU number field 2263. Needless to say, the application of the data de-duplication may not be limited to the virtualized volumes. For example, it may be applied to one or more LUs allocated to the hosts, or one or more LUs, RAID groups, or disk arrays previously set by the data de-duplication program 223 and having no relation to the hosts.

The configurations of the storage systems 1 and 2 in Embodiment 1 are as described above. However, these configurations are merely examples of the storage systems utilizing the invention. Accordingly, although, in Embodiment 1, the data de-duplication program 223 and the duplicate data management table 224 providing the data de-duplication function are stored in the memory 220 in the disk array 200, there is no limitation to this configuration. For example, the data de-duplication function may be provided outside the disk array 200, for example, in a data de-duplication device in an independent computer that mediates the transmission of data between the host system 100 and disk array 200 via the SAN. Alternatively, the data de-duplication function may be provided in an apparatus other than the de-duplication apparatus, for example, in a virtualization apparatus.

In that case, the disk array 200 and the external data de-duplication program 223 and duplicate data management table 224 are connected via the management I/F 260 or FC I/F 250 in the disk array 200 so that they can transmit the information in the above-described power-saving group management table 222, duplicate data management table 224, and data pool management table 226, and duplication un-compared data management table 225, which is required in the power saving control involving the data de-duplication.

A duplication un-compared data management table 225 is for managing the pieces of write data (hereinafter sometimes called "un-compared data") that have been written in the disks without being compared to the pieces of data having identical hash values because the upper limit for the number of concurrently-active RAID groups is exceeded if the pieces of data having the identical hash values are read from relevant disks.

As shown in FIG. 5, the duplication un-compared data management table 225 includes a temporary data storage address field 2251, host-designated address field 2252, and hash value field 2253. The temporary data storage address field 2251 stores the addresses where pieces of data are temporarily stored during the data de-duplication. The host-designated address field 2252 stores the host-designated addresses. The hash value field 2253 stores hash values of the pieces of data stored in the temporary data storage addresses. Information is stored in the duplication un-compared data management table 225 as shown in the example of FIG. 5 where, for the data "LU03:100000" stored in the temporary data storage address field 2251, "001:109000" is stored in the host-designated address field 2252, and "a" is stored in the hash value field 2253.

(1-4) Power-Saving Control Involving Data De-Duplication

In the data de-duplication, when the disk array 200 receives write data from the host system 100, the data de-duplication program 223 performs a high-speed search using hashes and judges whether or not the write data has already been written in the disks 291-298 as described above.

However, in the case where the synonym occurs, i.e., where there are hash values identical to that of the write data, in the disk array 200 having received the write data from the host system 100, access is made to all the disks associated with, from among the LUs listed as the data de-duplication targets in the data pool management table 226, the LUs storing the pieces of data having the identical hash values.

Meanwhile, as described above, in the disk array 200, the power-saving group control program 221 limits the number of concurrently-active RAID groups using the power-saving group management table 222 so that the power consumption can be reduced.

Accordingly, during the data de-duplication, when read-accessing the disks 291-298 to compare the content of the pieces of data having identical hash values, and if any RAID group including a read target logical address is in inactive status, it takes time to activate the relevant disks and so the performance will degrade. Also, if the activation of that RAID group is restricted by the upper limit, the RAID group cannot be active and so the data comparison is inoperable.

Moreover, in the case where pieces of data having identical hash values belong to different RAID groups, each time another identical hash value is found, the RAID groups storing the pieces of data having the identical hash values have to be activated, so the power saving effect will lessened.

The processing according to the invention capable of solving the above problem will be explained below with reference to the flowcharts in FIGS. 6-9.

Figure 6:
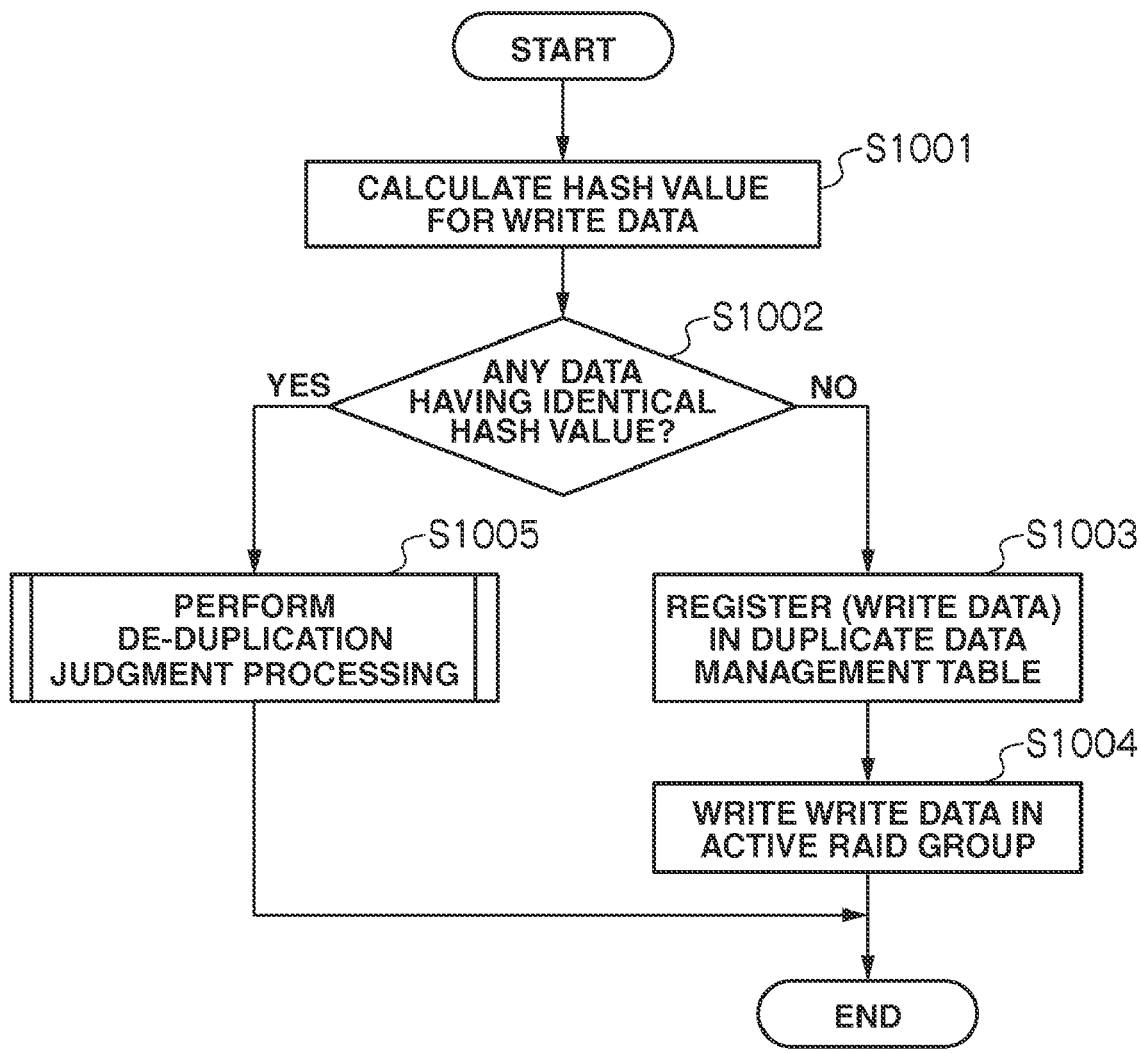
FIG. 6 is a flowchart showing write processing according to Embodiment 1.

First, write processing performed for the host system 100's write access will be explained below. FIG. 6 is a flowchart showing the write processing. The processing is started when the disk array 200 receives, from the host system 100, write data and the host-designated address of the write destination.

In step S1001, the data de-duplication program 223 calculates the hash value of the write data. In step S1002, it judges whether or not any hash value identical to the calculated hash value is found in the hash value field 2241 in the duplicate data management table 224.

If an identical hash value is not found (S1002: NO), it means that the write data is new data, so in step S1003 the data de-duplication program 223 adds the information for the write data to the duplicate data management table 224, i.e., stores its hash value in the hash value field 2241, writes the destination logical address in the real data-storing address field 2242, and writes the host-designated address in the host-designated address field 2243. Then, in step S1004, it refers to the power-saving group management table 222 and writes the write data in an LU in an active RAID group.

Meanwhile, if an identical hash value is found in the duplicate data management table 224 (S1002: YES), it means that identical data might have already been written in the disks, so in step S1005 the data de-duplication program 223 executes the de-duplication judgment.

When step S1004 or step S1005 is complete, the write processing is over.

Figure 7:
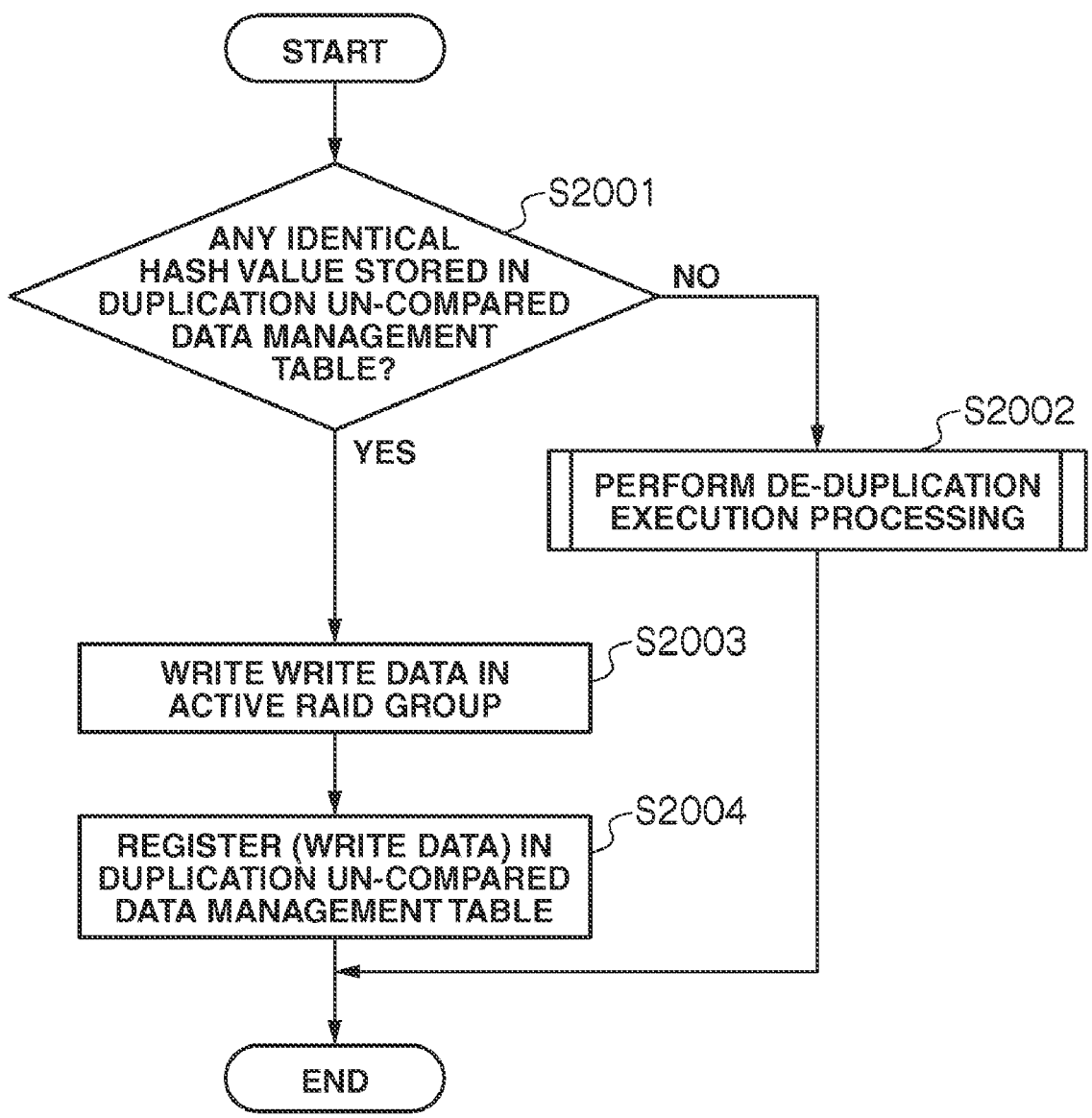
FIG. 7 is a flowchart showing de-duplication judgment processing according to Embodiment 1.

De-duplication judgment processing will be explained below. FIG. 7 is a flowchart showing the details of the de-duplication judgment in step S1005.

In step S2001, the data de-duplication program 223 judges whether or not a hash value identical to that of the write data is found in the hash value field 2253 in the duplication un-compared data management table 225.

If it is judged in step S2001 that no identical value is found (S2001: NO), in step S2002, the data de-duplication program 223 executes the de-duplication execution. This will be explained later with reference to FIG. 8.

Meanwhile, if an identical hash value is found in step S2001 (S2001: YES), it means that a un-compared piece of data having an identical hash value already exists in the disks. In order to compare the content of that un-compared data with that of the write data, it is necessary to read, from the relevant disks, all the pieces of data having the identical hash values stored in the duplicate data management table 224 and duplication un-compared data management table 225. In Embodiment 1, however, not all the disks can be active concurrently because of the upper limit for the number of concurrently-active RAID groups. Accordingly, since not all the pieces of data having the identical hash values can be read from the disks, in step S2003 the data de-duplication program 223 refers to the power-saving group management table 222 and writes the write data in an LU in an active RAID group without comparing its data with other pieces of data.

Then, in step S2004, the data de-duplication program 223 registers the write data in the duplication un-compared data management table 225 as a un-compared piece of data. More specifically, it stores the logical address in the disks where the write data was written in step S2003 in the temporary data storage address field 2251, the host-designated address of the write data in the host-designated address field 2252, and the hash value of the write data in the hash value field 2253.

Figure 8:
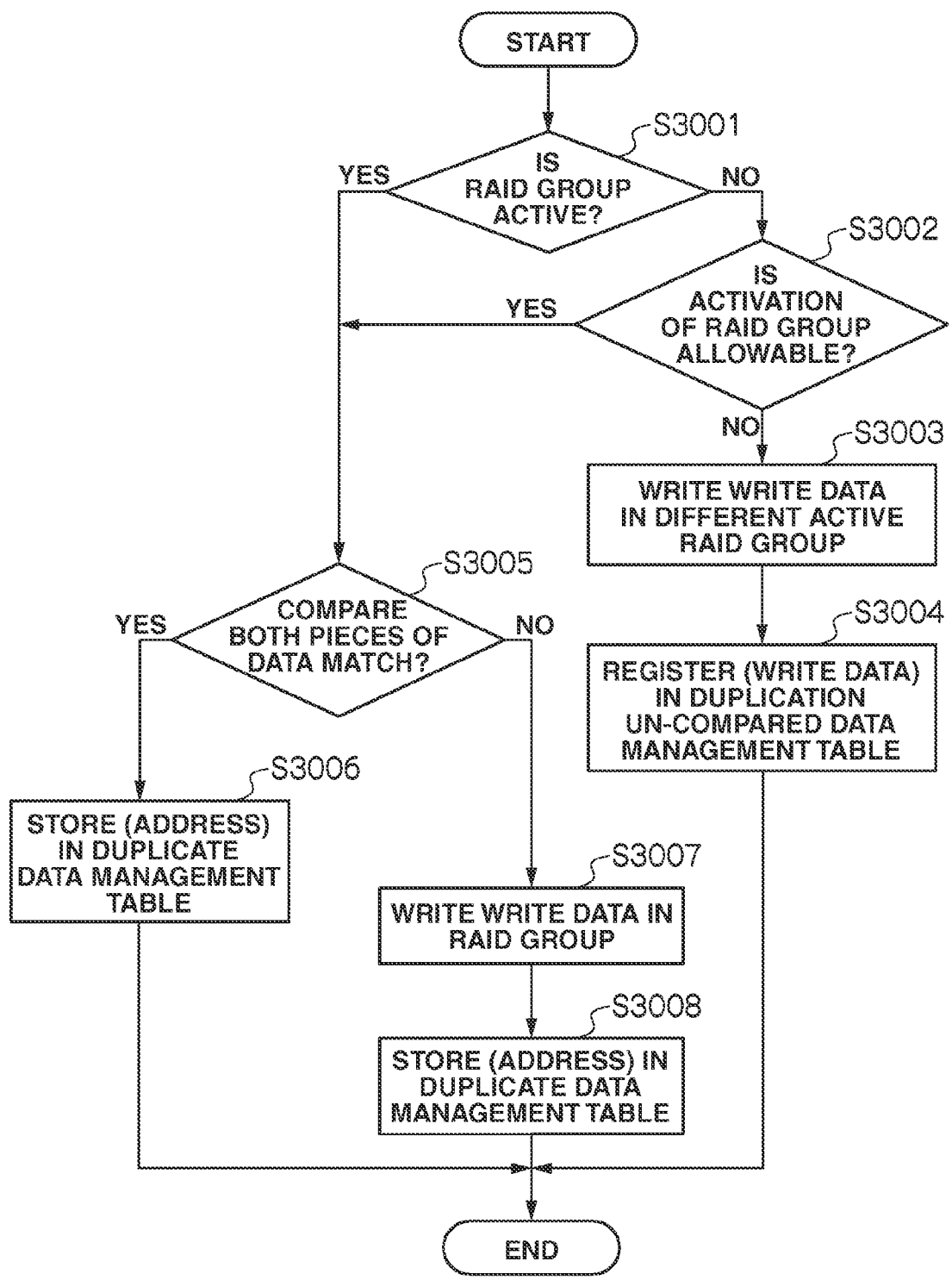
FIG. 8 is a flowchart showing de-duplication execution processing according to Embodiment 1.

The de-duplication execution processing will be explained below. FIG. 8 is a flowchart showing the de-duplication execution processing.

In step S3001, the data de-duplication program 223 checks: the LU number(s) stored in the real data-storing address field 2242 corresponding to the hash value identical to that of the write data in the duplicate data management table 224; and the same LU number(s) stored in the LU number field 2224 in the power-saving group management table 222, to judge whether or not the "status" in the status field 2222 corresponding to the RAID group that LU(s) belongs to is "active."

If the status registered in the status field 2222 for that RAID group is "inactive" (S3001: NO), in step S3002, the data de-duplication program 223 judges whether or not the activation of the RAID group the LU(s) belongs to is allowable. The power-saving group control program 221 judges it by checking whether or not the activation is restricted by the upper limit by referring to the power-saving group management table 222.

As a result of the judgment in step S2003, if the activation of the RAID group is not allowable (S3002: NO), the data de-duplication program 223 cannot read the data having the identical hash value from the disks. Accordingly, it cannot compare the content of that data with that of the write data. Therefore, in step S3003, the data de-duplication program 223 refers to the power-saving group management table 222 and writes the write data in an LU in an active RAID group, one different from the RAID group checked in step S3001.

In step S3004, the data de-duplication program 223 registers the write data in the duplication un-compared data management table 225 as un-compared data. More specifically, it stores the logical address in the disks where the write data is written in step S3003 in the temporary data storage address field 2251, the write data's host-designated address in the host-designated address field 2252, and its hash value in the hash value field 2253.

Meanwhile, if the status registered in the status field 2222 is "active" (S3001: YES) or if it is judged in step S3002 that the activation of the RAID group is allowable (S3002: YES), in step S3005, the data de-duplication program 223 activates the RAID group, reads from the relevant disks the data in all the logical addresses registered in the real data-storing address field 2242 corresponding to the hash value identical to that of the write data in the duplicate data management table 224, and compares it with the write data in step S3005.

As a result of the comparison in step S3005, if the pieces of data match (S3005: YES), it means that identical data already exists in the disks 291-298, so the data de-duplication program 223 does not write the write data in the disks 291-298. Then, in step S3006 it registers, in the duplicate data management table 2242, the host-designated address of the write data in the host-designated address field 2243 in the same line as the logical address of the data judged identical in step S3005 registered in the real data-storing address field 2242.

Meanwhile, as a result of the comparison in step S3005, if the pieces of data do not match (S3005: NO), in step S3007 the data de-duplication program 223 judges that the write data is new data and writes it in an LU in the RAID group, which is active or activated when reading the comparative data in step S3005, by referring to the power-saving group management table 222.

Then, in step S3008, the data de-duplication program 223 adds, in the duplicate data management table 224, the logical address of the write destination for the write data to the real data-storing address field 2242 in the line corresponding to the hash value identical to that of the write data, and also adds the address designated by the host system 100 to the host-designated address field 2243.

So far, the processing performed for the write data sent from the host system 100 to the disk array 200 has been explained. In this processing, write data for which no other data is found having an identical hash value is stored in the disks 291-298 as new data, its calculated hash value is registered in the hash value field 2241, the logical address in the disks is registered in the real data-storing address field 2242, and its host-designated address is registered in the host-designated address field 2243 (in the duplicate data management table 224).

Meanwhile, write data for which another piece of data having an identical hash value is found but differences are confirmed by the comparison is stored in the disks 291-298, its logical address in the disks is registered in the line in the real data-storing address field 2242 corresponding to the already-existing identical hash value, and its host-designated address is registered in the same line in the host-designated address field 2243 (in the duplicate data management table 224).

Further, write data for which comparison cannot be performed with the data having an identical hash value due to the upper limit for the number of the concurrently-active power-saving groups, the logical address in the disks where the write data is temporarily written is registered in the temporary data storage address field 2251, its hash value is registered in the hash value field 2253, and its host-designated address is registered in the host-designated address field 2252 (in the duplication un-compared data management table 225).

Data optimization processing by the data de-duplication program 223 according to the invention will be explained below. The data optimization processing is to compare the un-compared pieces of data registered in the duplication un-compared data management table 225 with the other pieces of data in the disks having hash values identical to the un-compared pieces of data and perform, if some of them match, the usual data de-duplication. It also includes migrating, in the disks 291-298, pieces of data having hash values identical to those of others but different in content, so that the pieces of data having the identical hash values are collected to the same power-saving group.

The result of the data optimization processing is that, after that processing, when write data is received and has to be compared with other pieces of data in the disks having identical hash values, it is only necessary to activate the power-saving group the pieces of data having the identical hash values belong to in order to read the pieces of data from the disks.

Figure 9:
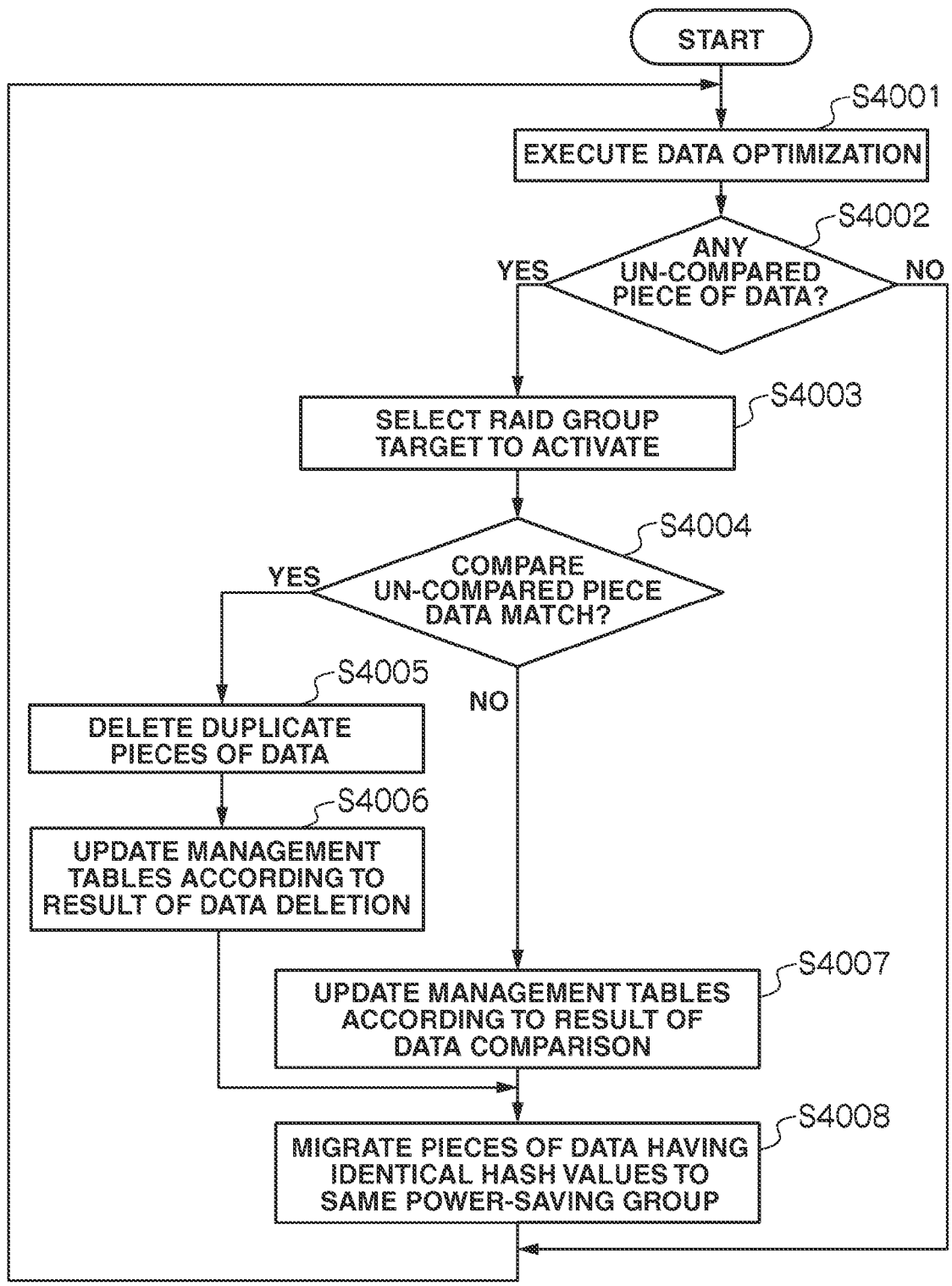
FIG. 9 is a flowchart showing an example of data optimization processing according to Embodiment 1.

The data optimization processing in Embodiment 1 will be explained below. FIG. 9 is a flowchart showing the procedure of the data optimization processing.

First, in step S4001, the data de-duplication program 223 executes data optimization when it is triggered by any of the situations (1)-(6) described below. More specifically, they are (1) when activation/deactivation of a RAID group occurs during normal operation, (2) when an inactive RAID group is activated for a health check or similar, (3) when the upper limit is still unreached, (4) when the volume occupancy rate of a RAID group—power-saving group—stored in the volume occupancy rate field 2225 in the power-saving group management table 222 exceeds a threshold value designated by the user, (5) when the number of un-compared pieces of data registered in the duplication un-compared data management table 225 exceeds a predetermined threshold value, and (6) when the user or the application in the host system 100 designates the data optimization. Although, the optimization processing is started by any of the triggers (1)-(6) in Embodiment 1, other triggers may also start the optimization.

In step S4002, the data de-duplication program 223 refers to the duplication un-compared data management table 225 and judges whether or not any un-compared piece of data exists. If no un-compared piece of data exists (S4002: NO), it returns to step S4001 and waits for a trigger for the data optimization processing.

Meanwhile, if un-compared pieces of data exit (S4002: YES), the data de-duplication program 223 selects RAID group targets that have to be activated to compare the un-compared pieces of data with the other pieces of data in the disks having the identical hash values, and stores the result in the activation target power-saving group management table 227.

As a specific example, the data de-duplication program 223 obtains, for each un-compared piece of data, the LU numbers associated with hash values identical with the value of the un-compared piece of data, from the temporary data storage address field 2251 in the duplication un-compared data management table 225 and from the real data-storing address field 2242 in the duplicate data management table 224. Then, it selects the RAID groups the LU numbers belong to from the power-saving group management table 222. As a result, for each hash value of all the pieces of un-compared data, RAID group targets (also called "activation target RAID groups") that have to be activated for data comparison are selected. Then, in step S4003, it stores the result in the activation target power-saving group management table 227.

Here, the activation target power-saving group management table 227 will be explained below. FIG. 11 shows the activation target power-saving group management table 227. The table is for managing the RAID group targets that will be activated for comparing data. The table includes hash value field 2271, activation target power-saving group field 2272, and number-of-pieces-of-data with identical hash value field 2273. The hash value field 2271 stores hash values. The activation target power-saving group field 2272 stores activation target power-saving groups. The number-of-pieces-of-data with identical hash value field 2273 stores the number of pieces of data having identical hash values. Information is stored in the activation target power-saving group management table 227 as shown in the example of FIG. 11 where, for the hash value "a" in the hash value field 2271, three RAID groups "RG01, RG02, RG03" are registered in the activation target power-saving group field 2272 and, in the number-of-pieces-of-data with identical hash value field 2273, "2" is registered as the number of pieces of data having the hash value "a" in the RAID group "RG01," "1" is registered corresponding to the RAID group "RG02," and "1" is registered corresponding to the RAID group "RG03".

In Embodiment 1, because the RAID groups are set as power-saving groups, identifiers of the RAID groups are registered in the activation target power-saving group field 2272; however, if other units are set as the power-saving groups, power-saving group identification numbers may be used.

In step S4004, the data de-duplication program 223 refers to the activation target power-saving group management table 227 and power-saving group management table 222; instructs the power-saving group control program 221 to activate the activation target RAID groups within the upper limit set in the power-saving group control program 221; and compares, for each hash value, the content of un-compared piece data with that of the other pieces of data having identical hash values.

Incidentally, if the total number of activation target RAID groups exceeds the upper limit, the data de-duplication program 223 activates the activation target RAID groups in turn so that the upper limit will not be exceeded and reads the data therein; stores the read data in the cache memory 230 in the disk array 200; and compares them to one another. Alternatively, a part of an active disk may be used as a temporary area in place of the cache memory 230. Moreover, the upper limit may be changed by giving an alert to the user.

Regarding the pieces of data found identical in content in the comparison in step S4004 (S4004: YES), the data de-duplication program 223 judges that more than one duplicate pieces of data exist in the disks. Therefore, in step S4005, it leaves one of the duplicate pieces of data and deletes the rest. Duplicate pieces of data are deleted starting with the un-compared pieces of data when all the duplicate pieces of data belong to the same RAID group. Meanwhile, when the duplicate pieces of data belong to different RAID groups, they are deleted starting with the data stored in the activation target power-saving group where the number of pieces of data having the identical hash values is small, from among the activation target power-saving groups storing the pieces of data having the identical hash values registered in the activation target power-saving group management table 227.

In step S4006, the data de-duplication program 223 updates the duplicate data management table 224, duplication un-compared data management table 225, and activation target power-saving group management table 227 according to the data deletion in the disks 291-298.

As a specific example, if the data deleted in step S4005 is data registered in the duplication un-compared data management table 225, the data de-duplication program 223 deletes the information for that data from the table 225 and re-registers it in the duplicate data management table 224. This registration is specifically to add the information for the "host-designated address" of the un-compared piece of data to the line in the host-designated address field 2243 in the duplicate data management table 224 corresponding to the piece of data having the identical hash value and data content. Consequently, in the duplicate data management table 224, more than one host-designated address is registered for one combination of a hash value and real data-storing address.

Meanwhile, if the data deleted in step S4005 is data stored in the duplicate data management table 224, in step S4006, the data de-duplication program 223 updates the duplication un-compared data management table 225 and duplicate data management table 224 as explained below.

The above update means deleting the information for the un-compared piece of data that was compared with the deleted data from the duplication un-compared data management table 225 and re-registering it in the duplicate data management table 224. More specifically, the data de-duplication program 223 re-registers the relevant "temporary data storage address," "hash value," and "host-designated address," which had been stored in the duplication un-compared data management table 225, in the real data-storing address field 2242, hash value field 2241, and host-designated address field 2243 in the duplicate data management table 224. It also deletes the information for the deleted data from the duplicate data management table 224 and adds the information for the host-designated address for the deleted data to the line in the host-designated address field 2243 corresponding to the data migrated as above from the duplication un-compared data management table 225 to the duplicate data management table 224. The order of these updates may be altered but, in any case, there is only one of the duplicate pieces of data having identical content left in the disks 291-298 in the disk array 200, and all the information for the host-designated addresses for that data will remain. Lastly, the data de-duplication program 223 reduces the numbers registered in the number-of-pieces-of-data with identical hash value field 2273 in the activation target power-saving group management table 227 according to the number of deleted pieces of data.

Meanwhile, if the pieces of data are found not identical in content as a result of the comparison in step S4004 (S4004: NO), the data de-duplication program 223 judges that no duplicate pieces of data exist in the disks 291-298. In this case, even though the pieces of data have the identical hash values, they will not be deleted because they are different in content. In step S4007, the data de-duplication program 223 updates the duplication un-compared data management table 225 and duplicate data management table 224 as follows.

The data de-duplication program 223 deletes the information for the data having different content from the duplication un-compared data management table 225 and re-registers it in the duplicate data management table 224.

More specifically, in step S4007, the data de-duplication program 223 migrates, from among the information for the data having different content stored in the duplication un-compared data management table 225, its "temporary data storage address" and "host-designated address" to the real data-storing address field 2242 and host-designated address field 2243 to the line in duplicate data management table 224 corresponding to the identical hash value. Consequently, in the duplicate data management table 224, more than one combination of a real data-storing address and host-designated address is registered for one hash value.

The duplication data deletion steps S4004-S4007 are repeated until there is no information left in the duplication un-compared data management table 225.

Lastly, in step S4008, the data de-duplication program 223 migrates the pieces of data different in content but having identical hash values to a same power-saving group; and updates the duplicate data management table 224 and activation target power-saving group management table 227 according to the migration.

As a specific example, the data de-duplication program 223 refers to the real data-storing address field 2242 in the duplicate data management table 224 and the power-saving group management table 222. If pieces of data having identical hash values are stored in different power-saving groups, the data de-duplication program 223 migrates these pieces of data so that they are collected in one power-saving group. The migration source and migration destination are determined by referring to the number-of-pieces-of-data with identical hash value field 2273 in the activation target power-saving group management table 227, so that the above pieces of data are migrated from the power-saving group with a smaller number registered in the field 2273 to the power-saving group having a larger number. According to this data migration, the data de-duplication program 223 changes, from among the information for the migrated pieces of data in the duplicate data management table 224, their real data-storing addresses in the real data-storing address field 2242 to the addresses of the data migration destinations. It also updates the relevant numbers registered in the number-of-pieces-of-data with identical hash value field 2273 in the activation target power-saving group management table 227 according to the migration of the different pieces of data to one power-saving group.

Step S4008 is repeated until, for each hash value, the number of pieces of data registered in the number-of-pieces-of-data with identical hash value field 2273 in the activation target power-saving group management table 227 are collected in one "activation target power-saving group."

When step S4008 is complete, the data de-duplication program 223 returns to step S4001 and, when data optimization is triggered by any of the above situations, performs the processing again.

According to the storage system 1 in Embodiment 1, when the data de-duplication and disk operation control are performed simultaneously in the disk array 200, the efficiency in data capacity is improved by the data de-duplication while the power saving effect is maximized by the disk operation control.

Note that Embodiment 1 is merely an example and the processing may also be performed using a different procedure. In other words, any procedure may be adopted as long as duplicate pieces of data having identical content are deleted, leaving one in the disks, and the pieces of data different in content but having identical hash values belonging to different power-saving groups are collected in a single power-saving group. As another procedure, in order to reduce the number of times the power-saving groups are activated during the data optimization processing, steps S4002-S4008 may be performed simultaneously.

Embodiment 2 (2-1) Configuration

The configuration of a storage system in Embodiment 2 is the same as that of the storage system 1 in Embodiment 1 so explanations will be omitted.

(2-2) Power Consumption Reduction in Disk Array

Power consumption reduction in Embodiment 2 is the same as that in Embodiment 1 so explanations will be omitted. However, in Embodiment 2, of the power-saving groups, one or more power-saving groups ("permanently-active groups") are defined as groups that are always active and so accessible while the disk array 200 is in operation.

(2-3) Data De-Duplication

Data de-duplication in Embodiment 2 is the same as that in Embodiment 1, so explanations will be omitted.

(2-4) Power Saving Control Involving Data De-Duplication

Power saving control in Embodiment 2 is the same as that in Embodiment 1 except for the points below, so explanations will be given only for the differences.

Unlike Embodiment 1, in Embodiment 2, the above permanently-active groups are used as temporary storage areas for un-compared pieces of data. Accordingly, all the un-compared pieces of data in step S2002 are temporarily stored in the permanently-active groups. Moreover, in the duplication data deletion in step S4005 and the migration of the pieces of data having identical hash values in step S4008 in the data optimization processing, the permanently-active groups always serve as the deletion source and migration source.

Moreover, making the most of the feature that the permanently-active groups are always accessible, when the number of pieces of data having identical hash values exceeds a predetermined threshold value, all the pieces of data having that hash value may be migrated to the permanently-active groups.

Accordingly, in the judgment in step S3001 in FIG. 8, as to whether or not a relevant power-saving group is active, because the permanently-active groups are always active, the data de-duplication may be performed without activating an extra power-saving group.

Note that, in Embodiment 2, permanently-active groups are one control mode of power-saving groups consisting of one or more disks 291-298. However, they may also be one control mode of power-saving groups consisting of, not the disks 291-298, but storage areas, such as volatile/non-volatile memory that are accessible while the disk array 200 is in operation.

Embodiment 3 (3-1) Configuration

The configuration of a storage system in Embodiment 3 is the same as that in Embodiment 1, so explanations will be omitted.

(3-2) Power Consumption Reduction in Disk Array

Power consumption reduction in Embodiment 3 is the same as that in Embodiment 1 so explanations will be omitted.

(3-3) Data De-Duplication

Data de-duplication in Embodiment 3 is the same as that in Embodiment 1 so detail explanations will be omitted. However, in Embodiment 3, the data de-duplication program 223 divides the write data the host system 100 sends to the disk array 200 into segments and calculates hash values for those segments. The size of the segments may differ according to the specifications for the data de-duplication.

(3-4) Data De-Duplication Involving Power Saving Control

Explanations will be given below only to the differences from Embodiment 1.

Unlike Embodiment 1, in Embodiment 3, write data is divided into segments. The host system 100 recognizes these segments as consecutive pieces of data. Accordingly, the probability is high that these pieces of data are read simultaneously from the disks when the host system 100 makes a read request. If the above feature is adopted in Embodiment 1, some pieces of data ("relevant pieces of data") in the set of consecutive segments may be stored in different power-saving groups (RAID groups in the case of Embodiment 1). In that case, more than one power-saving group is involved in calling the consecutive segments. If the power-saving groups are in a power-saving mode such as an inactive mode, activation of these groups consumes great power because they are plural in number, which will impair the power saving effect. Therefore, in Embodiment 3, information for the relationships between consecutive pieces of data are managed and, during the data optimization processing, the pieces of data are arranged so that they belong to the same power-saving group.

More specifically, the duplicate data management table 224 in FIG. 3 and duplication un-compared data management table 225 in FIG. 5 each further include a relevant address field for storing relevant addresses. FIG. 12 shows a duplicate data management table 228 including the relevant address field, and FIG. 13 shows a duplication un-compared data management table 229 including the same.

As shown in FIG. 12, the duplicate data management table 228 includes a relevant address field 2284 in addition to hash value field 2281, real data-storing address field 2282 and host-designated address field 2283. Also, as shown in FIG. 13, the duplication un-compared data management table 229 includes a relevant address field 2294 in addition to temporary data storage address field 2291, host-designated address field 2292 and hash value field 2293.

As shown in FIGS. 12 and 13, the relevant address field 2284 is associated one-to-one with the real data-storing address field 2282 while the relevant address field 2294 is associated one-to-one with the temporary data storage address field 2291. Regarding the data stored in an address registered in the real data-storing address field 2282 or temporary data storage address field 2291, when there are relevant pieces of data, the addresses of those relevant pieces of data in the disks are also registered in the fields.

The procedure for registering more than one address as above will be explained below based on Embodiment 1. In Embodiment 1, when write data is written in disks, i.e., when a real data-storing address is registered in the duplicate data management table 228 or a temporary data storage address is registered in the duplication un-compared data management table 229, the logical address of a relevant piece of data in the disks 291-298 is registered in the relevant address field 2284 or relevant address field 2294. Note that if there is more than one relevant piece of data, more than one logical address is stored in the relevant address fields 2284 and 2294.

During the data optimization processing, after the migration of the pieces of data having identical hash values and the update of the management tables such as the duplicate data management table 228 and duplication un-compared data management table 229, data re-arrangement and table update using the "relevant addresses" are performed. These may be performed simultaneously.

Figure 14:
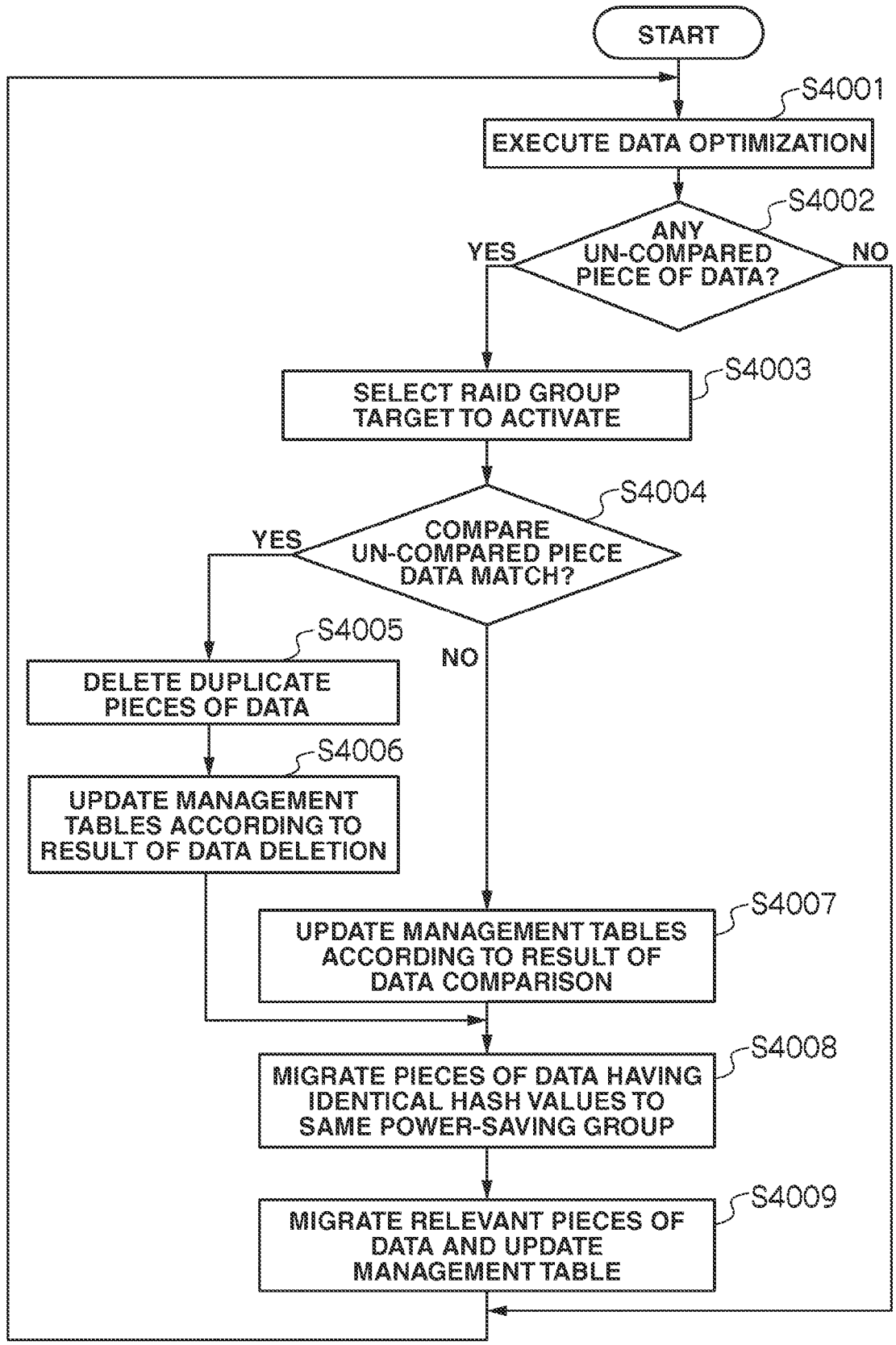
FIG. 14 is a flowchart showing an example of the data optimization processing according to Embodiment 3.

Now, the data optimization processing in Embodiment 3 will be explained below. FIG. 14 is a flowchart showing the data optimization processing. Steps S4001-S4008 in FIG. 14 are the same as those in FIG. 9, so new step S4009 will be explained below in detail.

In step S4009, the data de-duplication program 223 refers to the real data-storing address field 2282 and relevant address field 2284 in the duplicate data management table 228. When it judges that the LU numbers in the both fields are different, it further judges whether these LU numbers belong to different RAID groups by referring to the power-saving group management table 222. If it judges that they belong to different RAID groups, it migrates the relevant pieces of data to the same RAID group and updates the real data-storing address field 2282 and relevant address field 2284 in the duplicate data management table 228 according to the addresses changed in the data migration. The data de-duplication program 223 repeats step S4009 until the "read data-storing addresses" and "relevant addresses" belong to the same RAID group. As a result, the "relevant pieces of data" are stored in the same RAID group (power-saving group).

Meanwhile, the pieces of data having identical hash values and more than one "real data-storing address" registered in the duplicate data management table 228 have already been collected to the same power-saving group, so step S4009 is unnecessary for them.

Note that the user may select which kind of collection—collection of pieces of data having identical hash values in the same power-saving group, or collection of relevant pieces of data in the same power-saving group—they assign priority to. Alternatively, the priority may be set automatically, for example, by comparing the number of pieces of data having identical hash values and the number of pieces of relevant data and giving priority to the collection of the larger number of pieces of data.

Embodiment 3 was explained giving an example where write data is divided into relevant pieces of data by the data de-duplication program 223; however, it may divided into relevant pieces of data by an application program in the host system 100 based on the information representing data continuity, for example, the characteristics of differential files.

Also, in Embodiments 1-3, for ease of explanation, the agent of the processing is the power-saving group control program 221 or the data de-duplication program 223; however, the processing is actually performed by the CPU 210 running the power-saving group control program 221 or data de-duplication program 223.

Moreover, in Embodiments 1-3, write data to be handled may be in units of either blocks or files.

Further, although the invention is employed in a storage system including a disk array 200 in a storage system in the above-explained Embodiments 1-3, it may also be employed in a variety of storage systems.

In the above-explained embodiments, the invention is employed in a storage system 1 having: a host system 100; and a disk array 200 having a plurality of disks 291-298 storing pieces of data sent from the host system 100 and a plurality of logical units 281-283 configured from the disks 291-298, the disk array 200 further including: a power-saving group management table 222 storing group information including at least information for RAID groups 271 and 272 configured from the logical units 281-283 and information on whether or not these RAID groups 271 and 272 are active; a disk array controller 240 for switching ON/OFF of the power of the disks 291-298 associated with the logical units 281-283 in the RAID groups; a duplicate data management table 224 storing management information including: logical unit numbers (LUs) for the logical units 281-283 associated with storage locations of the pieces of data stored in the disks 291-298; hash values representing bit strings for the pieces of data; and host-designated numbers associated with the logical units 281-283 and designated by the host system 100. The disk array 200 executes a calculation step (S1001) of calculating, when receiving a piece of data from the host system 100, a value representing the bit string for the piece of data; a judgment step (S1002) of judging whether or not a hash value identical to the calculated hash value is stored in the duplicate data management table 224; and a first storing step (S1003 and S1004) of storing, when it is judged in the judgment step that no identical hash value is stored, the received piece of data in the duplicate data management table 224 and storing it in disk(s) 291-298 associated with a logical unit number of a logical unit constituting an active group, based on the power-saving group management table 222; and a second storing step (S1005) of storing, when it is judged in the judgment step that an identical hash value is stored, the received piece of data in disk(s) 291-298 based on the group information in the power-saving group management table 222 and the management information in the duplicate data management table 224. However, the invention is not limited to this configuration.

Also, in the above-explained embodiments, the invention is employed in the configuration where the disk array 200 further comprises a duplication un-compared data management table 225 storing un-compared data information including at least the logical unit numbers of logical units 281-283 temporarily storing pieces of data and hash values representing the bit strings for the pieces of data, and the second storing step comprises: a non-comparison judgment step (S2001) of judging whether or not a hash value identical to the hash value representing the bit string for the received piece of data is stored in the un-compared data management table; a un-compared data processing step (S2003, S2004) for: storing, when it is judged in the non-comparison judgment step that an identical hash value is stored, the received piece of data in disk(s) 291-298 associated with the logical unit number of a logical unit constituting an active group, based on the power-saving group management table 222; and storing the logical unit number associated with disk(s) 291-298 storing the received piece of data, and the hash value representing the bit string for the received piece of data in the duplication un-compared data management table; and a de-duplication step (S2002) of performing, when it is judged in the non-comparison judgment step that an identical hash value is not stored, de-duplication processing to prevent the received piece of data from being stored redundantly. However, the invention is not limited to this configuration.

Also, in the above-explained embodiments, the invention is employed in the configuration where the de-duplication step comprises: a status judgment step (S3001) of judging, based on the power-saving group management table 222, whether or not disk(s) 291-298 storing the piece of data having a hash value identical to the hash value representing the bit string for the received piece of data, are active; a data judgment step (S3005) of reading, when it is judged in the status judgment step that disk(s) 291-298 is active, the piece of data having the identical hash value from disk(s) 291-298, and judging whether or not the read piece of data and the received piece of data match; a third storing step (S3006) of storing, when it is judged in the data judgment step that the pieces of data match, a host 100-designated number for the received piece of data in the duplicate data management table 224, associating it with the logical unit number of the read piece of data; and a fourth storing step (S3007, S3008) of storing, when it is judged in the data judgment step that the above pieces of data do not match, the received piece of data in disk(s) 291-298 storing the read piece of data and storing the management information for the received piece of data in the duplicate data management table 224. However, the invention is not limited to this configuration.

Moreover, in the above-explained embodiments, the invention is employed in the configuration where the de-duplication step further comprises: an activation judgment step (S3002) of judging, when it is judged in the status judgment step that disk(s) 291-298 is not active, whether or not a RAID group, managed in the power-saving group management table 222, that stores the piece of data having the identical hash value, can be activated, and wherein when it is judged in the activation judgment step that the RAID group can be activated, the disk array controller 240 switches on the power for the disk(s) 291-298 associated with the groups; and when the power for the disk(s) 291-298 is switched on, the data judgment step includes judging whether or not the above pieces of data match. However, the invention is not limited to this configuration.

Moreover, in the above-explained embodiments, the invention is employed in the configuration where the de-duplication step further comprises a fifth storing step (S3003, S3004) of storing, when it is judged in the activation judgment step that the RAID group cannot be activated, the received piece of data in disk(s) 291-298 associated with an active group and storing the management information for the received piece of data in the duplicate data management table. However, the invention is not limited to this configuration.

Moreover, in the above-explained embodiments, the invention is employed in the configuration where the disk array 200 further includes an activation target power-saving group table 227 for storing activation target information including hash values representing the bit strings for pieces of data, activation target RAID groups, and the counts for the hash values; and executes an optimization step of performing, when the un-compared data information is stored in the duplication un-compared data management table 225, optimization processing to relocate the pieces of data having identical hash values so that they belong to the same group. However, the invention is not limited to this configuration.

This invention can be widely applied in storage systems and power consumption reduction methods for the storage systems.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage system including a computer, and a storage apparatus having a plurality of disk devices storing pieces of data sent from the computer and a plurality of logical units configured from the disk devices, comprising:
    a group management table storing group information including at least information for one or more groups configured from the logical units and information on whether or not these groups are active;
    a power control unit which switches ON/OFF the power of the disk devices associated with the logical units in the groups;
    a data management table storing management information including: logical unit numbers corresponding to the logical units associated with storage locations of the pieces of data stored in the disk devices, values representing bit strings for the pieces of data, and computer-designated numbers associated with the logical units;
    a calculation unit which calculates, when receiving a piece of data from the computer, a value representing the bit string for the piece of data;
    a judgment unit which judges whether or not a value identical to the value calculated by the calculation unit is stored in the data management table;
    a first storing unit which stores, when the judgment unit judges that no identical value is stored, the received piece of data in the data management table and stores it in one or more disk devices associated with a logical unit number of a logical unit constituting an active group, based on the group management table;
    a second storing unit which stores, when the judgment unit judges that an identical value is stored, the received piece of data in one or more of the disk devices based on the group information in the group management table and the management information in the data management table; and
    a un-compared data management table storing un-compared data information including at least the logical unit numbers of logical units temporarily storing pieces of data and values representing the bit strings for the pieces of data,
    wherein the second storing unit comprises:
    a non-comparison judgment unit which judges whether or not a value identical to the value representing the bit string for the received piece of data is stored in the un-compared data management table,
    a un-compared data processing unit which stores, when the non-comparison judgment unit judges that an identical value is stored, the received piece of data in one or more disk devices associated with the logical unit number of a logical unit constituting an active group, based on the group management table, and stores the logical unit number associated with the disk devices storing the received piece of data, and the value representing the bit string for the received piece of data in the un-compared data management table, and
    a de-duplication unit which performs, when the non-comparison judgment unit that judges an identical value is not stored, de-duplication processing to prevent the received piece of data from being stored redundantly;
    wherein the de-duplication unit comprises:
    a status judgment unit which judges, based on the group management table, whether or not one or more disk devices storing the piece of data having a value identical to the value representing the bit string for the received piece of data, are active;
    a data judgment unit which reads, when the status judgment unit judges that the disk devices are active, the piece of data having the identical value from the disk devices, and judges whether or not the read piece of data and the received piece of data match;
    a third storing unit which stores, when the data judgment unit judges that the pieces of data match, a computer-designated number for the received piece of data in the data management table, and associates it with the logical unit number of the read piece of data; and
    a fourth storing unit which stores, when the data judgment unit judges that the above pieces of data do not match, the received piece of data in the disk devices storing the read piece of data, and stores the management information for the received piece of data in the data management table.

2. The storage system according to claim 1, wherein the de-duplication unit further comprises:
    an activation judgment unit which judges, when the status judgment unit judges that the disk devices are not active, whether or not a group, managed in the group management table, that stores the piece of data having the identical value can be activated;
    when the activation judgment unit judges that the group can be activated, the power control unit switches on the power for the disk devices associated with the groups; and when the power for the disk devices is switched on, the data judgment unit judges whether or not the above pieces of data match.

3. The storage system according to claim 2, wherein the activation judgment unit judges whether or not the group can be activated by comparing a predetermined number of concurrently-active groups and the number of groups currently active.

4. The storage system according to claim 2, wherein the de-duplication unit further comprises a fifth storing unit for storing, when the activation judgment unit judges that the group cannot be activated, the received piece of data in one or more disk devices associated with an active group and storing the management information for the received piece of data in the data management table.

5. The storage system according to claim 1, wherein the groups are RAID groups.

6. The storage system according to claim 1, further comprising:
an activation target table storing activation target information including values representing the bit strings of pieces of data, activation target groups, and the counts for the values; and
an optimization unit which performs, when the un-compared data information is stored in the un-compared data management table, optimization processing to relocate the pieces of data having identical values so that they belong to the same group.

7. The storage system according to claim 6, wherein the optimization by the optimization unit is triggered by at least any of the situations of:
when activation/deactivation of a group occurs during normal operation; when an inactive group is activated;
when the number of un-compared pieces of data stored in the un-compared data management table exceeds a predetermined threshold value; and
when the optimization is designated by a user or the computer.

8. A storage system power consumption reduction method that includes a storage system, the storage system including:
a computer; and
a storage apparatus having a plurality of disk devices storing pieces of data sent from the computer and a plurality of logical units configured from the disk devices,
wherein the storage apparatus comprises:
a group management table storing group information including at least information for one or more groups configured from the logical units and information on whether or not these groups are active;
a power control unit which switches ON/OFF of the power of the disk devices associated with the logical units in the groups;
a data management table storing management information including:
logical unit numbers for the logical units associated with storage locations of the pieces of data stored in the disk devices; values representing bit strings for the pieces of data; and computer-designated numbers associated with the logical units; and
the method comprising:
a calculation step of calculating, when receiving a piece of data from the computer, a value representing the bit string for the piece of data;
a judgment step of judging whether or not a value identical to the calculated value is stored in the data management table;
a first storing step of storing, when it is judged in the judgment step that no identical value is stored, the received piece of data in the data management table and storing it in one or more disk devices associated with a logical unit number of a logical unit constituting an active group, based on the group management table;
a second storing step of storing, when it is judged in the judgment step that an identical value is stored, the received piece of data in one or more of the disk devices based on the group information in the group management table and the management information in the data management table,
wherein the storage apparatus further comprises a un-compared data management table storing un-compared data information including at least the logical unit numbers of logical units temporarily storing pieces of data and values representing the bit strings for the pieces of data, and
wherein the second storing step comprises:
a non-comparison judgment step of judging whether or not a value identical to the value representing the bit string for the received piece of data is stored in the un-compared data management table,
a un-compared data processing step for storing, when It is judged in the non-comparison judgment step that an identical value is stored, the received piece of data in one or more disk devices associated with the logical unit number of a logical unit constituting an active group, based on the group management table,
storing the logical unit number associated with the disk devices storing the received piece of data, and the value representing the bit string for the received piece of data in the un-compared data management table, and
a de-duplication step of performing, when it is judged in the non-comparison judgment step that an identical value is not stored, de-duplication processing to prevent the received piece of data from being stored redundantly;
wherein the de- duplication step comprises:
a status judgment step of judging, based on the group management table, whether or not one or more disk devices storing the piece of data having a value identical to the value representing the bit string for the received piece of data, are active;
a data judgment step of reading, when it is judged in the status judgment step that the disk devices are active, the piece of data having the identical value from the disk devices, and judging whether or not the read piece of data and the received piece of data match;
a third storing step of storing, when it is judged in the data judgment step that the pieces of data match, a computer-designated number for the received piece of data in the data management table, and associating it with the logical unit number of the read piece of data; and
a fourth storing step of storing, when it is judged in the data judgment step that the above pieces of data do not match, the received piece of data in the disk devices storing the read piece of data, and storing the management information for the received piece of data in the data management table.

9. The storage system power consumption reduction method according to claim 8, wherein the de-duplication step further comprises:
an activation judgment step of judging, when it is judged in the status judgment step that the disk devices are not active, whether or not a group, managed in the group management table, that stores the piece of data having the identical value, can be activated, wherein when it is judged in the activation judgment step that group can be activated, the power control unit switches on the power for the disk devices associated with the groups; and when the power for the disk devices is switched on, the data judgment step includes judging whether or not the above pieces of data match.

10. The storage system power consumption reduction method according to claim 9, wherein the activation judgment step includes judging whether or not the group can be activated by comparing a predetermined number of concurrently-active groups and the number of groups currently active.

11. The storage system power consumption reduction method according to claim 9, wherein the de-duplication step further comprises:

a fifth storing step of storing, when it is judged in the activation judgment step that the group cannot be activated, the received piece of data in one or more disk devices associated with an active group and storing the management information for the received piece of data in the data management table.

12. The storage system power consumption reduction method according to claim 8, wherein the groups are RAID groups.

13. The storage system power consumption reduction method according to claim 8, wherein the storage apparatus further comprises:

an activation target table storing activation target information including values representing the bit strings for pieces of data, activation target groups, and the counts for the values; and the method further comprises an optimization step of performing, when the un-compared data information is stored in the un-compared data management table, optimization processing to relocate the pieces of data having identical values so that they belong to the same group.

14. The storage system power consumption reduction method according to claim 13, wherein the optimization step is triggered by at least any of the situations of:

when activation/deactivation of a group occurs during normal operation, when an inactive group is activated, when the number of un-compared pieces of data stored in the un-compared data management table exceeds a predetermined threshold value, and when the optimization is designated by a user or the computer.

* * * * *